UNITED STATES PATENT OFFICE.

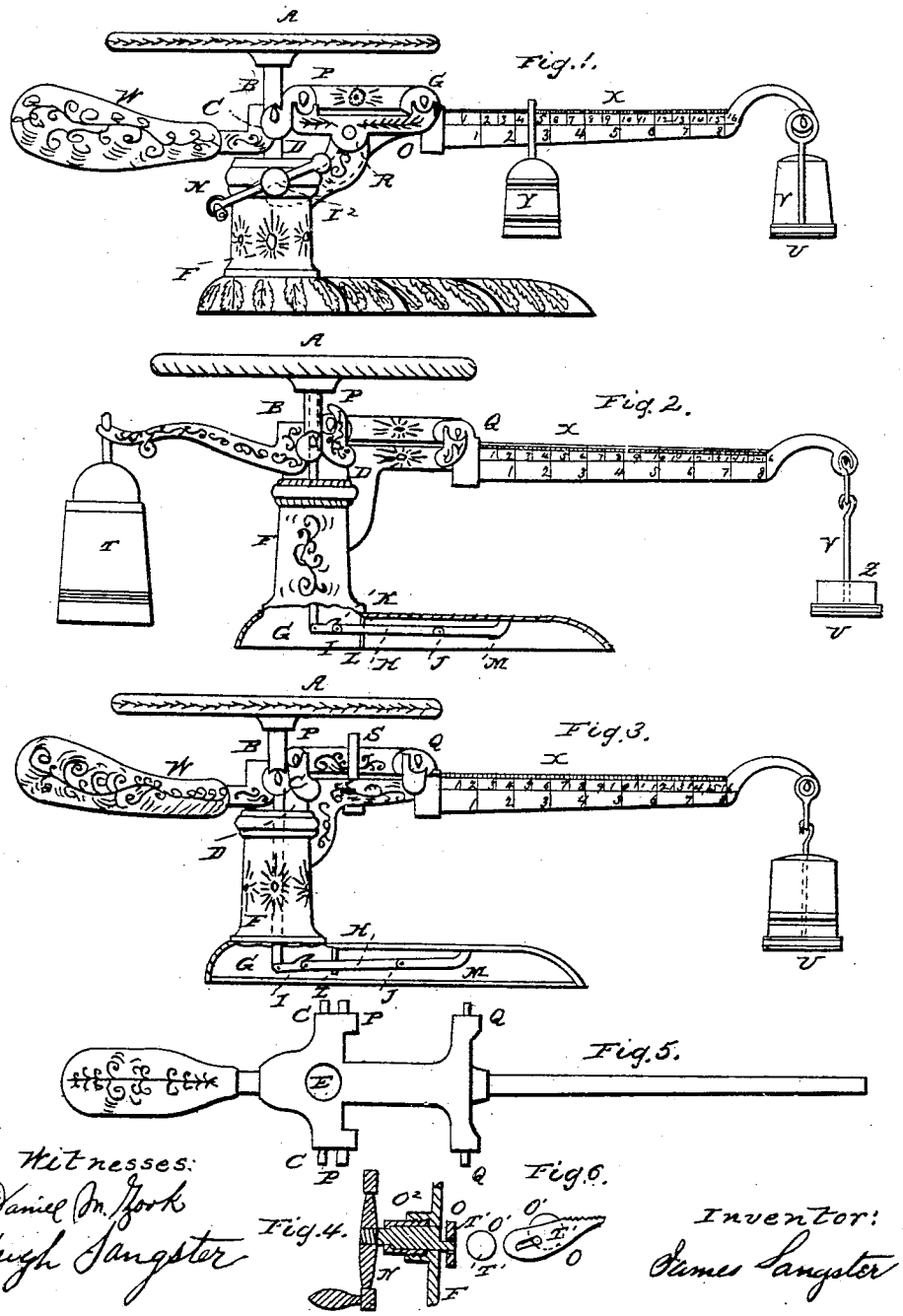

JAMES SANGSTER, OF BUFFALO, NEW YORK.

IMPROVEMENT IN SCALES.

Specification forming part of Letters Patent No. 51,357, dated December 5, 1865.

*To all whom it may concern:*

Be it known that I, JAMES SANGSTER, of Buffalo, in the county of Erie and State of New York, have invented certain new and useful Improvements in Scales for Light or Heavy Weighing; and I do hereby declare that the following is a full and exact description thereof, reference being had to the accompanying drawings, and to the letters of reference marked thereon.

The nature of my invention is, first, providing the scale-beam with a double set of pivots and bearings, in addition to those used for supporting the platform, when said beam is used in connection with a stand or base upon which it is supported, and a platform upon which the materials to be weighed are placed, one set of said pivots only being used at a time—one for weighing light weights and the other for weighing heavy weights; second, in providing that part of the scale which keeps the platform in a horizontal position, or level, while being raised or lowered in the act of weighing or balancing with a double-acting compound lever, one part only of which is brought into action while weighing heavy weights or using the pivots nearest each other, and the whole of which is brought into action when the beam is balanced on the pivots farthest from each other, or when used for light weighing; third, in placing the bearings for the pivots on a vibrating frame and so arranging it that one set of bearings may be raised and the other lowered at the same time, for the purpose of releasing one set of the pivots at the same time that the other is brought into action.

To enable others skilled in the art to make and use my invention, I will proceed to describe its construction and operation.

I construct my scale of the material in common use for making scales. The pivots are finely-tempered cast-steel. The bearings are tempered cast-steel, and for the cheaper scales case-hardened cast-iron. The beam is made of brass, and sometimes of cast or wrought iron. The frame-work and base are usually made of cast-iron.

In the accompanying drawings the same letters in the several figures represent similar parts in each.

Figure 1 is a side elevation, showing the scale complete, the beam and the weights for balancing it, the double set of pivots and their bearings on the vibrating frame, also the handle for moving the vibrating frame and throwing into action either set of pivots. Fig. 2 is also a side elevation, showing the action of the compound lever when the beam is balanced upon the pivots farthest from each other, or in the position for light weighing. Fig. 3 is a similar view of the scale, showing the action of the compound lever when weighing heavy weights or when the beam is balanced on the pivots nearest each other. Fig. 4 shows the device for moving the vibrating frame. Fig. 5 is a plan view of the beam, representing the arrangement of the pivots and its general form.

In Fig. 1, A is the platform upon which the articles to be weighed are placed. A dish such as is now in common use may be used either in its place or in connection with it, if desired.

B is the bearing upon which the platform stands. It rests and works upon the sharp edge of the pivot C.

D is a rod fastened into the center of the platform, and running down through an opening in the seam, which is shown and marked E in Fig. 5, and through the body F, as shown by the dotted lines in Figs. 2 and 3 of the stand, and connecting by a joint with the compound lever at the point G. H is said lever. It is made of two pieces—a short lever and a long one. The long one is fastened by a joint at the point J to a piece marked M, which is fastened to the under part of the foot or base of the scale. At the opposite end the short lever is fastened by a joint, (shown by the letter I.)

K represents a stop to prevent the opposite end of the short lever from raising too high while swinging or turning on the joint I.

X is the beam. C, P, and Q are the pivots upon which it balances. The beam is divided by two rows of figures. The upper row, when it is balanced on the pivots C and Q, represents ounces. The lower row, when it is balanced on the pivots C and P, represents pounds. This arrangement of figures can be changed according to the distance the pivots are set apart from each other.

Y is the sliding weight for the beam. V and U represent the common device for regulating the balance of the beam and for receiving weights. It is fastened to the end of the beam in the usual way.

R is the rocking or vibrating frame, upon which the bearings are placed for the pivots P and Q. It is operated by the crank N, as shown in Fig. 1. The crank is fastened to the body F, as shown in Fig. 4. O' is a rod attached to the crank N. T' is a pin on the end of it. This rod turns in an aperture made through the body of the base at the point I², as shown in Fig. 1, the pin T' of course passing through.

O is a lever forming part of the vibrating frame, one end of which passes into the column or body of the base. It has a slot in that end, as shown in Fig. 6. The pin T' works in that slot. Its action is obvious.

By turning the crank N about half-way round to the right, the end of the frame R near the letter Q is raised up and the beam is thrown upon the pivot Q. The weight W now overbalances the opposite end of the beam, and a weight is required to balance it at V U. It is now ready for light weighing. By turning the crank N to the left the beam is thrown upon the pivots C and P, and off from the pivot Q. It is now ready for heavy weighing.

For common grocer-scales the vibrating frame R may be dispensed with when desired, and a stationary permanent one substituted in its place, and the change from one set of pivots to the other effected by the weights at the opposite side of the seam, the weight at V U being made heavy enough to make the beam balance on the pivots C and Q, and the weight W being of the proper weight to balance it on the pivots C and P when the weight is taken off from V U.

The weight W may be dispensed with, if desired, by making the beam to balance on the pivots C and Q without weights at either end, and then causing it to balance on the pivots C and P by hanging a weight on the back end of the beam, if desired.

In Figs. 2 and 3 is shown a strip of iron or brass fastened to the under side of the foot and projecting down to the bottom of the lever H, where it is bent at right angles, so as to pass under and hold it in its proper position.

The object of the compound lever is as follows: The distance between the edges of the pivots C and Q must be exactly the same as the distance between the joints G and J of the lever, or no scale can be made to weigh correctly; hence the necessity of making the lever double-acting, so that when the pivots C and P are in action only that part of the lever running from I to G is required to move. In using the scale for heavy weighing the platform drops lower than for light weighing. This of course allows the lever H to rest upon the piece L, its own weight keeping it down while the short end of the lever is in action. When used in the other pivots, C and Q, the whole lever swings up and down with the platform, its own weight and the stop K keeping it in a straight line.

By these improvements in scales I claim greater accuracy of weight than by the other scales of the same capacity now in use. It is also more sensitive than any other scale, a large one being capable of weighing accurately from a fraction of a dram to over two hundred pounds, if required.

I do not claim, broadly, the use of a double set of pivots and bearings in addition to those used for suspending the beam, as shown in the common steelyard, in which the beam itself, in order to increase or change its capacity for weighing, has to be reversed or turned over, both sides having a row of notches for the movable weight; but What I do claim as my invention, and desire to secure by Letters Patent, is—

1. Providing the scale-beam with a double set or pair of pivots and bearings in addition to those used for supporting the platform, when said beam is used in connection or combination with a stand or base upon which it is supported and a platform upon which the materials to be weighed are placed.

2. The double lever H, with the stop K, or its equivalent, and the rest or piece L, when said lever is so constructed that one part only is brought into action while weighing heavy weights, and the whole of which is brought into action while weighing light weights.

3. The frame R, when constructed as and for the purposes herein substantially set forth and described.

JAMES SANGSTER.

Witnesses:
DANIEL M. ZOOK,
HUGH SANGSTER.